(12) United States Patent
McDermott

(10) Patent No.: US 10,829,030 B2
(45) Date of Patent: Nov. 10, 2020

(54) TIE-DOWN ASSEMBLY

(71) Applicant: Chad Nolan McDermott, Mystic, IA (US)

(72) Inventor: Chad Nolan McDermott, Mystic, IA (US)

(73) Assignee: Chad McDermott, Mystic, IA (US)

( * ) Notice: Subject to any disclaimer, the term of this patent is extended or adjusted under 35 U.S.C. 154(b) by 37 days.

(21) Appl. No.: 16/410,528

(22) Filed: May 13, 2019

(65) Prior Publication Data

US 2019/0351810 A1    Nov. 21, 2019

Related U.S. Application Data

(60) Provisional application No. 62/672,127, filed on May 16, 2018.

(51) Int. Cl.
*B60P 7/08* (2006.01)

(52) U.S. Cl.
CPC .............. *B60P 7/0807* (2013.01); *B60P 7/08* (2013.01)

(58) Field of Classification Search
CPC .................................. B60P 7/0807; B60P 7/08
USPC ................ 410/102, 106, 107, 109–112, 116; 24/115 K, 265 CD, 298, 302
See application file for complete search history.

(56) References Cited

U.S. PATENT DOCUMENTS

| | | | |
|---|---|---|---|
| 8,002,505 B2 * | 8/2011 | Laney ................... | B60P 7/0823 410/101 |
| 2015/0165961 A1 * | 6/2015 | Miller ................... | B60P 7/0807 410/101 |

* cited by examiner

*Primary Examiner* — Stephen T Gordon
(74) *Attorney, Agent, or Firm* — Zarley Law Firm, P.L.C.

(57) ABSTRACT

A tie-down assembly includes a hollow elongated member, a cable, and a cover. The cable is threaded through the hollow elongated member and threaded through an eyelet in the cover. From the eyelet, the cable is threaded back through the hollow elongated member to form a loop. Once threaded, the ends of the cable are joined with a stop.

9 Claims, 2 Drawing Sheets

TIE-DOWN ASSEMBLY

CROSS REFERENCE TO RELATED APPLICATION

This application claims the benefit of U.S. Provisional Application No. 62/672,127 filed on May 16, 2018, the contents of these applications are hereby incorporated by reference in their entirety.

BACKGROUND OF THE INVENTION

This invention is directed to a tie-down assembly and more particularly to a tie-down assembly for securing a load to an anchoring member such as the bed of a pick-up truck or the like.

Tie-down assemblies are known in the art. In one example a D-ring is attached to the head of a bolt and the bolt attached to the bed of a pick-up. While useful, the D-ring is limited in strength and therefore can bend or break when a heavy load is secured. Other tie-down assemblies have a profile that interferes with the horizontal plane of the truck bed. Accordingly, there exists a need in the art for a device that addresses these deficiencies.

An objective of the present invention is to provide a tie-down assembly with greater strength to accommodate a heavy load.

Another objective of the present invention is to provide a tie-down assembly having a profile that does not interfere with the horizontal plane of a truck bed.

These and other objectives will be apparent to one skilled in the art based upon the following written description, drawings and claims.

SUMMARY OF THE INVENTION

A tie-down assembly used to secure a load includes a cable, an elongated hollow tube, and a cover. Generally, the cable is threaded through the elongated hollow tube and connected to the cover.

The elongated hollow tube has a head at a first end, a second end, and at least a partially threaded outer surface in between. The cover has a top surface, a bottom surface, and an eyelet that extends downwardly from the bottom surface. The eyelet is positioned and adapted to be received within a bore of the hollow elongated tube.

The cable is inserted through the bore of the elongated hollow tube, then through the eyelet of the cover, and then back through the bore of the hollow elongated tube. Once threaded, the ends of the cable are connected with a stop.

DETAILED DESCRIPTION OF THE PREFERRED EMBODIMENT

Figure 1:
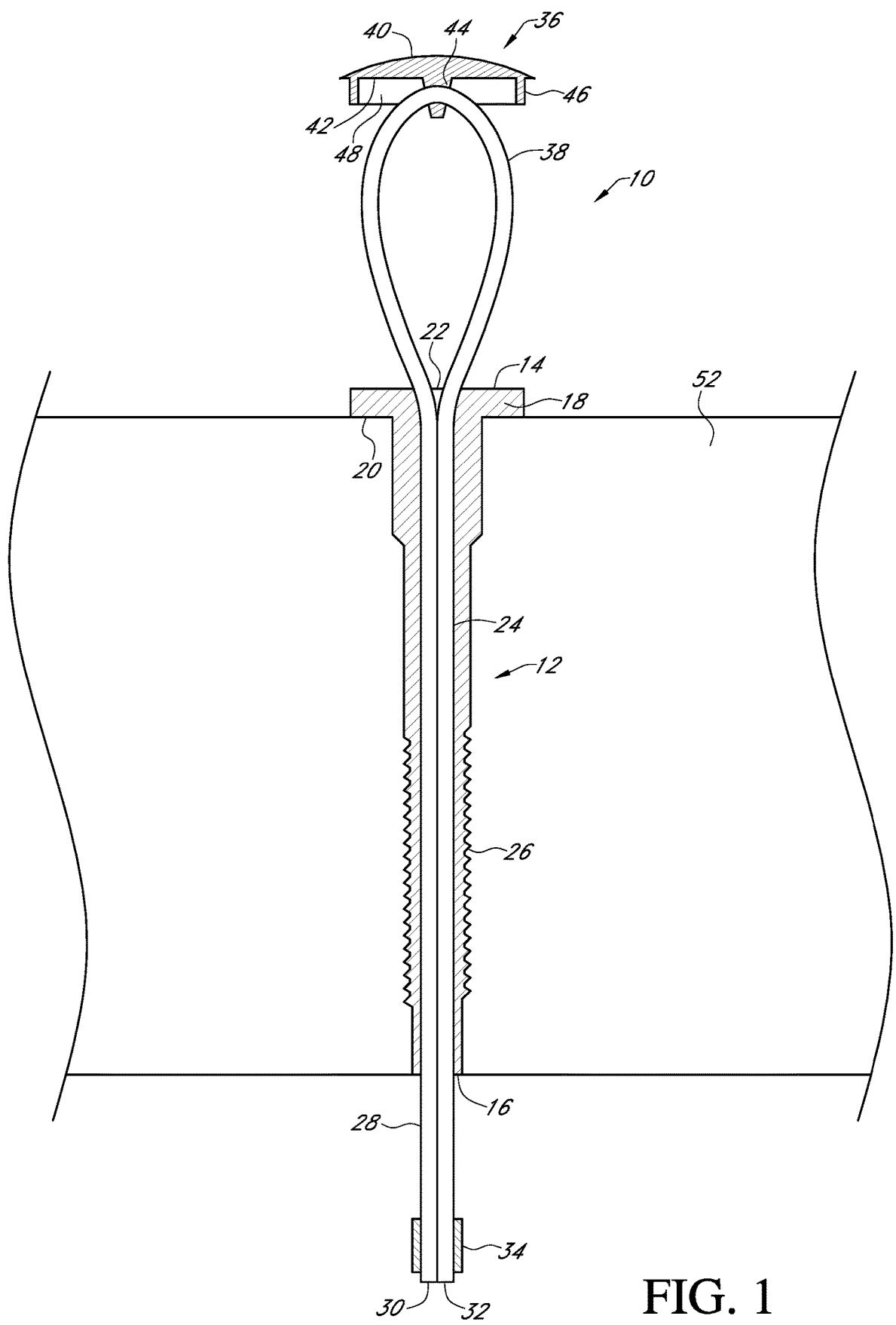
FIG. 1 is a side sectional view of a tie-down assembly.
Figure 2:
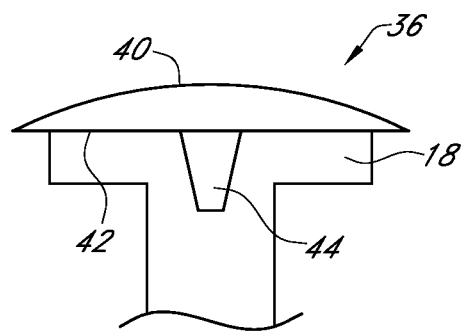
FIG. 2 is a partial side sectional view of a tie-down assembly.
Figure 3:
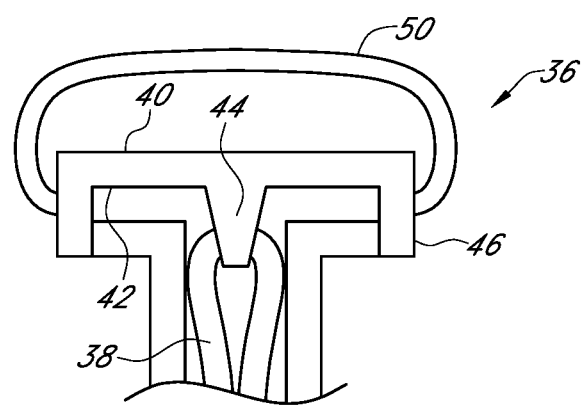
FIG. 3 is a partial side sectional view of a tie-down assembly.

Referring to the Figures a tie-down assembly 10 includes a hollow elongated tube or member 12 having a first end 14 and a second end 16. The tie-down assembly can be used in any application where an object needs to be secured. For purposes of example only the tie-down assembly is disclosed in reference to use with a bed of a pick-up truck. Attached to the first end 14 of the elongated member 12 is a head 18. The head 18 is either integrally molded or welded to the elongated member 12. The head 18 also is transverse to the elongated member 12 and extends radially outwardly from the elongated member 12 to form a shoulder 20. The head 18 has a central opening 22 in alignment with a bore 24 of the elongated member 12. An outer surface 26 of the elongated member 12 is preferably threaded.

Disposed through the bore 24 of the elongated member 12 and extending outwardly from the first and second ends 14 and 16 is a cable 28, rope or the like. The cable 28 has a first end 30 and a second end 32. Attached to the cable 28 adjacent the second end 16 of the elongated member 12 is a stop 34 and attached to the cable 28 adjacent the first end 14 is a cover 36.

In a preferred embodiment the cable 28 is looped. More specifically, the cable 28 extends from the first end 30 into the elongated member 12 at the second end 16 and out of the first end 14 where a loop 38 is formed. From the loop 38 the second end 32 of the cable 28 extends into the elongated member 12 at the first end 14 and out the second end 16 where the first 30 and second 32 ends of the cable 28 are connected by the stop 34. The stop 34 is of any size, shape, and structure. The stop 34 has a diameter greater than the diameter of the bore 24 of the elongated member 12 and preferably is a wedge fit.

The cover 36 is of any size, shape and structure. The cover 36 has a top surface 40 and a bottom surface 42. Extending downwardly from the bottom surface 42 is an eyelet 44 configured to receive the looped cable 28. The eyelet 44 is positioned to align and be selectively received within bore 24 of the elongated member 12.

In a normal, or non-operative position the bottom surface 42 of the cover 36 engages the head 18. Preferably, the diameter of the cover 36 is greater than the diameter of the head 18 to form a grasping lip. In one example, the cover 36 has an outer sidewall 46 that extends downwardly to form a partial chamber 48. The sidewalls 46 and partial chamber 48 are configured to selectively receive the head 18 within chamber 48. In yet another example, a grasping ring 50 is pivotally connected to the cover 36.

In operation the tie-down assembly 10 is connected to an anchoring member 52. The anchoring member 52 is of any type such as a truck bed or chassis, a frame, a block, the ground, or the like. To use, the cover 36 is manually pulled away from the head 18 causing the cable 28 to slide through the bore 24 of the elongated member 12 until the stop 34 engages the second end 16 of the elongated member 12. In this position the loop 38 is exposed and accessible. A retaining strap (not shown) is attached to the loop 38, stretched over the load to be retained (not shown) and connected to a second loop 38 of a second assembly. In a non-operating position the cover 36 and head 18 of the tie-down assembly is only slightly raised above the horizontal plane of the anchoring member 52.

What is claimed is:

1. A tie-down assembly, comprising;
a hollow elongated member having a first end and a second end;
a cable having a first end and a second end wherein the first end of the cable extends through a bore of the hollow elongated member from the second end of the hollow elongated member, through an eyelet in a cover and back through the bore of the hollow elongated member, and then attached to the second end of the cable with a stop to form a loop.

2. The assembly of claim 1 wherein the hollow elongated member has a head positioned at the first end of the hollow elongated member.

3. The assembly of claim 1 wherein the hollow elongated member has an outer surface that is at least partially threaded.

4. The assembly of claim 1 wherein the stop has a diameter greater than a diameter of the bore.

5. The assembly of claim 2 wherein the head extends transversely and radially outwardly in relation to the hollow elongated member.

6. The assembly of claim 1 wherein the cover has a top surface and a bottom surface and the eyelet extends downwardly from the bottom surface.

7. The assembly of claim 1 wherein the eyelet is positioned and adapted to be received within the bore of the hollow elongated member.

8. The assembly of claim 6 wherein the cover has an outer sidewall that extends downwardly to form a partial chamber.

9. The assembly of claim 6 wherein a grasping ring is pivotally connected to the top surface of the cover.

\* \* \* \* \*